United States Patent

Bestenreiner et al.

[15] 3,642,349
[45] Feb. 15, 1972

[54] METHOD OF REPRODUCING X-RAY PICTURES

[72] Inventors: Friedrich Bestenreiner, Gruenwald, Germany; Silvaan Rene Lambeir, Bonheiden; Louis Achilles Meeussen, Mortsel, both of Belgium

[73] Assignee: Agfa-Gevaert Aktiengesellschaft, Leverkusen, Germany

[22] Filed: Jan. 21, 1970

[21] Appl. No.: 4,627

[30] Foreign Application Priority Data

Jan. 21, 1969 Germany ............... P 19 02 748.6

[52] U.S. Cl. .................... 350/162 SF, 350/133, 355/22
[51] Int. Cl. ........................... G02b 27/22, G02b 27/38
[58] Field of Search ............ 350/162 SF, 205, 314, 133

[56] References Cited

UNITED STATES PATENTS

| | | | |
|---|---|---|---|
| 3,488,190 | 1/1970 | Smith | 350/162 SF UX |
| 3,504,606 | 4/1970 | Macovski | 350/162 SF UX |
| 3,470,310 | 9/1969 | Shashoua | 350/162 SF UX |
| 3,178,997 | 4/1965 | Kelly | 350/162 SF UX |
| 3,546,374 | 12/1970 | Graser, Jr. | 350/162 SF X |

FOREIGN PATENTS OR APPLICATIONS

| | | | |
|---|---|---|---|
| 11,466 | 6/1899 | Great Britain | 350/162 SF |

*Primary Examiner*—John K. Corbin
*Attorney*—Michael S. Striker

[57] ABSTRACT

Stereoscopic X-ray photographs form photographic pictures on one or two record carriers on which also gratings are formed. When the pictures are projected through apertures of a diaphragm, positive and negative images having different diffraction orders are produced whose intensities are simultaneously decreased and increased by grey wedges so that the combined image is varied between positive and negative conditions.

10 Claims, 7 Drawing Figures

3,642,349

METHOD OF REPRODUCING X-RAY PICTURES

BACKGROUND OF THE INVENTION

In the copending application Bestenreiner et al., Ser. No. 803,676, a photographic recording-reproducing method is disclosed in which the picture of an object and a grating are formed on a photosensitive layer. The picture is then reproduced by the use of different diffraction orders of the grating which serves as a spatial carrier frequency.

Carrier frequency photography of this type is particularly advantageously applied for the reproduction of X-ray pictures, particularly as used for the purpose of medical examination of human tissue. It is particularly important to distinguish small differences in absorption of the X-rays which are close to the limits of the physiological visual acuity. In order to examine details of the X-ray pictures, it is advantageous to combine a positive with a negative of the same object superimposed in a ratio of intensity which is adjustable. In this manner, a continuous adjustment between a positive and a negative image on the projection screen is possible.

It is one object of the invention to obtain this desired effect in a particularly simple manner by applying spatial carrier frequency photography.

Another object of the invention is to use higher and lower diffraction orders for reproducing positive and negative images.

SUMMARY OF THE INVENTION

In accordance with the invention, X-ray photographs are used for producing photographic pictures which are modulated in accordance with a grating, and for evaluating the photographic picture. The zero diffraction order, and also at least one higher order are superimposed in an adjustable ratio of intensity as a positive and a negative so that by adjustment of the intensities of the two images, the combined image is varied between positive and negative conditions.

The carrier frequency photography is particularly advantageous, since the zero diffraction order produces a reversed image of a higher order. Therefore, it is possible to produce of a single picture with modulated grating, simultaneously a positive and a negative. An intermediate step for reversing the original negative picture can be omitted.

In a modified method of the invention, a positive and a negative of an X-ray photograph are used. The positive and negative pictures are differently modulated and superimposed on a record carrier, and can be evaluated by simultaneous superimposed projection, while the intensities of the positive and negative pictures are simultaneously varied in opposite senses. In this arrangement it is also possible to project from a single record carrier, a positive and a negative of a picture thereon.

One method of the invention comprises forming on a photosensitive record carrier a photographic picture of an X-ray picture and a grating; illuminating and projecting along an optical axis the photographic picture and the grating through a first aperture for producing a first image having a predetermined diffraction order, preferably zero diffraction order, and through at least one second aperture for producing a second image having a higher diffraction order than the first image and being superimposed on the same for forming a combined image; and simultaneously decreasing the light intensity of one of the images while increasing the light intensity of the other image so that the combined image is varied between positive and negative conditions.

In another method of the invention, photographic images of positive and negative X-ray pictures of the same subject and having different gratings are projected onto the photographic record carrier and superimposed on the same for forming the photographic picture.

In both methods of the invention, it is advantageous to use two stereoscopic X-ray pictures so that the evaluated combined image is a stereoscopic image.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
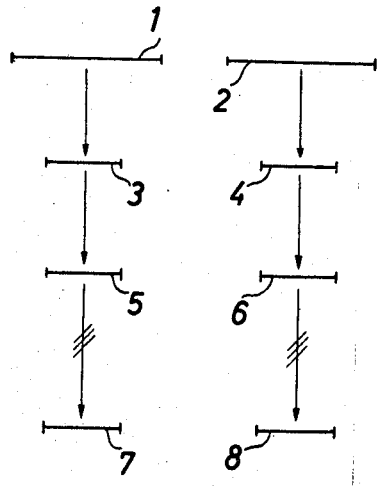
FIG. 1 is a schematic illustration showing the production of stereoscopic photographic pictures with gratings on two record carriers.

Two stereoscopic X-ray photographs 1, 2, which were produced by making exposures in spaced positions of the X-ray camera, are optically reduced in size and transferred to photosensitive layers 3 and 4, respectively. After development, the record carriers 3 and 4 are subjected to reciprocal filtering so that pictures 5 and 6 are produced. Reciprocal filtering serves the purpose of compensating aberrations occurring during the exposure of the original pictures 1 and 2. The aberrations may include a penumbra due to the finite extension of the source of light.

Figure 7:
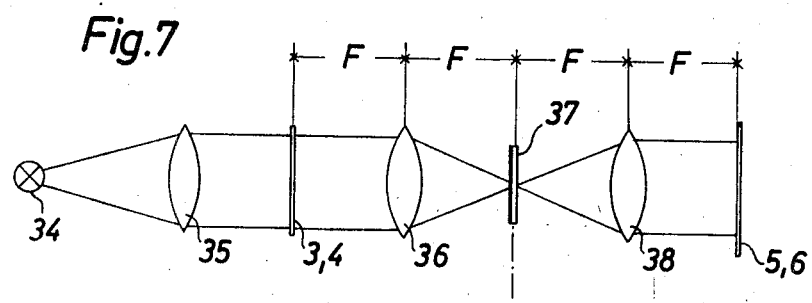
FIG. 7 is a schematic view illustrating an arrangement for reciprocal filtering used in the arrangements of FIGS. 1 and 4.

An arrangement for reciprocal filtering is shown in FIG. 7. A source of light 34, preferably a gas laser, generates light which is formed into parallel rays by a lens 35. In the beam of lens 35, the picture of record carrier 3 or 4 is located in the focal plane of a lens 36 in whose other focal plane, a reciprocal filter 37 is arranged. Filter 37 is also located in the focal plane of another lens 38, corresponding to lens 36, and projecting the optically corrected image 5 or 6, respectively. Filter 37 is adapted to the unfavorable factors during the exposure of the original X-ray photograph 1 and 2. Particulars of a reciprocal filtering arrangement as described above, which is not an object of the present invention, are found in the Journal of Applied Optics, Vol. 7, No. 4, pp. 663 to 641.

The corrected pictures 5 and 6 are now transferred to photosensitive record carriers 7 and 8 on which also a grating is formed in a manner which is disclosed in the copending application Bestenreiner et al., Ser. No. 803,676.

For example, a grating is brought into direct contact with the surface of the photosensitive record carriers 7 and 8, and the picture is imaged by a lens through the grating onto the photosensitive layer. The grating may be part of the camera, and used for several exposures. However, it is also possible to use a foil as grating which is adhesively attached to the surface of the photosensitive layers of record carriers 7 and 8. Before the layer is developed, the foil grating is removed in the manner of a decal. The grating produces intensive diffraction phenomena, and is as fine as possible. A grating may be produced by photographically superimposing two coherent rays.

It is also possible to image a picture on record carriers 5 and 6 by a first lens on the grating, which is imaged by a second lens on the photosensitive layer of record carriers 7 or 8.

Figure 2:
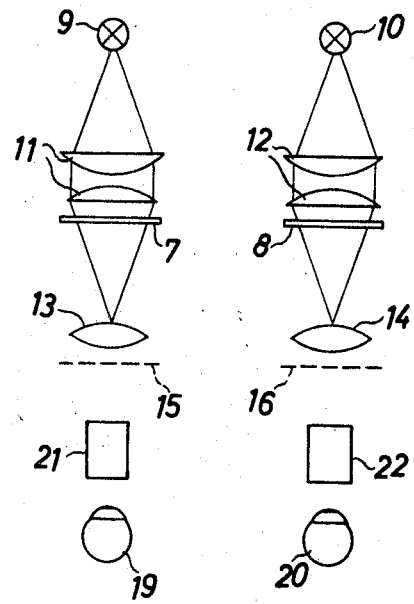
FIG. 2 is a schematic illustration showing the reproduction of the stereoscopic X-ray pictures.
Figure 3:
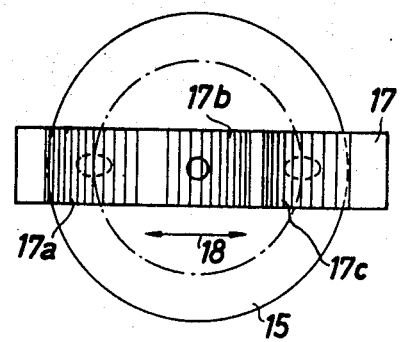
FIG. 3 is a front view illustrating a detail of the arrangement of FIG. 2 for varying the viewed image between a positive and a negative condition.

The photosensitive record carriers 7 and 8, with a stereoscopic picture and grating thereon, are reproduced for stereoscopic viewing by the arrangement shown in FIGS. 2 and 3. However, the method explained with reference to FIGS. 1 and 2 can also be applied to single pictures, and, for example, the left parts of FIGS. 1 and 2 may be omitted if no stereoscopic reproduction is desired.

As shown in FIG. 2, two sources of light 9 and 10 illuminate through condenser lenses 11 and 12 the photographic pictures and gratings on record carriers 7 and 8. Condensers 11 and 12 form an image of the sources of light 9 and 10 in the planes of imaging objectives 13 and 14. Diaphragms 15 and 16, and grey wedges, as will be explained with reference to FIG. 3, are located in the spatial frequency planes 15 and 16 which are located directly behind the imaging objectives 13 and 14. As shown in FIG. 3, a diaphragm 15 has a central aperture, and two apertures radially spaced from the same. The central aperture permits the passage of the rays of the zero diffraction order, and the outer apertures permit the passage of the rays of higher diffraction orders. The formation of the higher diffraction orders depends on the fineness and direction of the grating. Gratings having harmonic characteristics of the higher order cause occurrence of diffraction at the higher orders. The radial deviation of diffraction from the optical axis is also determined by the angular position of the grating. It is convenient to refer to a spatial frequency spectrum, the grating having the effect of a carrier frequency, as explained in the copending application Ser. No. 803,676.

The inner aperture is covered by an inner grey wedge 17b, and the outer apertures are covered by outer grey wedges 17a and 17c. The three grey wedges are combined in a slide 17 which can be shifted in opposite directions as indicated by arrow 18. The grey wedges 17a and 17c are darker on the left and become lighter on the right, while the grey wedge 17b is darker on the right and becomes lighter toward the left. Consequently, when slide 17 is moved to the left as viewed in FIG. 3, the intensity of the light passing through the central aperture is gradually reduced, while the intensity of the light passing through the two outer apertures is gradually increased.

By operation of the slide 17, the observer, whose eyes are indicated at 19 and 20 in FIG. 2, and who looks through oculars 21 and 22, can adjust the stereoscopic image which he sees, gradually and continuously between a negative condition and a positive condition. The positive picture is produced by rays passing through the central aperture, and a negative picture is produced by rays passing through the two outer apertures. Instead of grey wedges, other means for reducing the light intensity, such as iris shutters, or perforated shutters can be used.

Figure 4:
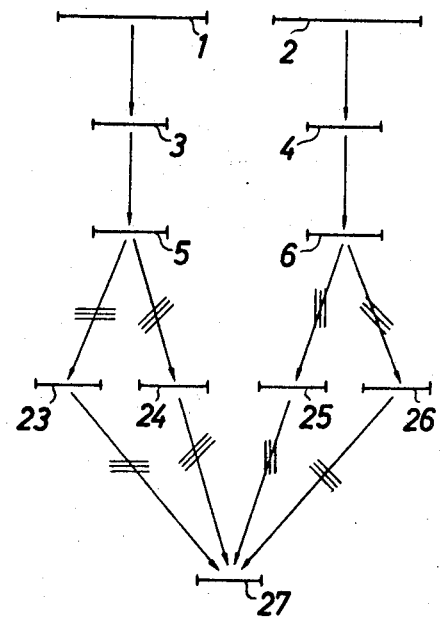
FIG. 4 is a schematic view illustrating the production of superimposed positive and negative pictures, and of stereoscopic pictures of the same subject on a record carrier, together with gratings.

FIG. 4 illustrates another arrangement for stereoscopic recording of X-ray photographs, in which a single record carrier 27 is used.

Two stereoscopic X-ray photographs 1 and 2 are transferred at reduced size to record carriers 3 and 4 and subjected to reciprocal filtering to produce corrected stereoscopic photographic pictures on record carriers 5 and 6. By an intermediate step, using a reversing material, a positive 23 and a negative 24 of the picture on record carrier 5, together with a grating are made. Preferably, the gratings for the photographic pictures on record carriers 23 and 24 are the same, and have the same grating constant, but are disposed at different angles. Gratings having parallel lines are suitable for this purpose. In this manner, the corrected image on record carrier 6 is used for forming a positive photographic picture 25 and a negative photographic picture 26 corresponding to the second stereoscopic X-ray photograph 2. Gratings are also produced on record carriers 25 and 26, and have different slants.

The carrier frequency-modulated photographic pictures 23, 24 and 25, 26 are copied onto a single record carrier 27 so that the same contain superimposed positive and negative pictures of both photographic pictures on record carriers 5 and 6, which have to be separated for reproduction. The method can also be applied to a single X-ray photograph 1, for example, so that two carrier modulated photographic pictures 23, 24, with gratings, are copied on record carrier 27.

Instead of making the intermediate pictures 23 to 26, it is also possible to reproduce the X-ray picture directly on the record carrier 27, superimposing the gratings with different azimuth angles.

Figure 5:
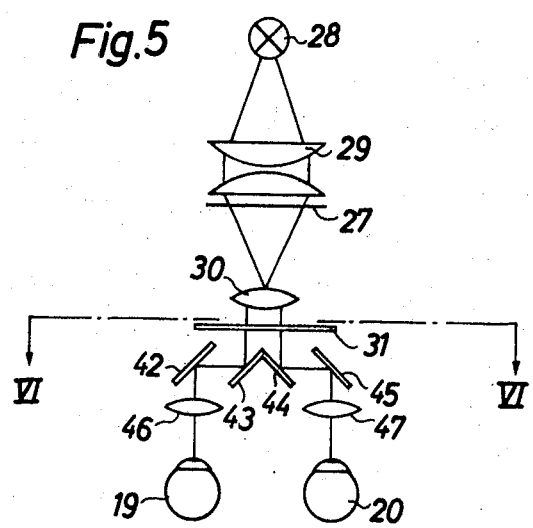
FIG. 5 is a schematic view illustrating the evaluation of a record carrier produced in accordance with FIG. 4 by stereoscopic viewing.
Figure 6:
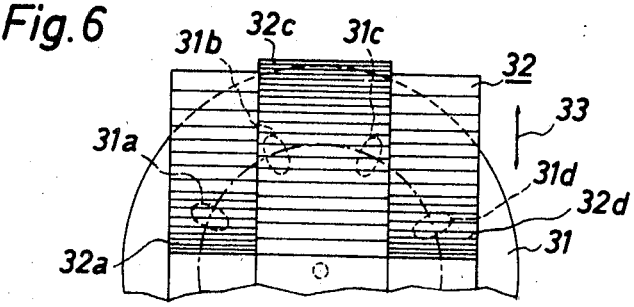
FIG. 6 is a fragmentary front view illustrating a detail of FIG. 5.

FIG. 5 and FIG. 6 illustrate an arrangement for stereoscopically reproducing the photographic pictures superimposed on record carrier 27. Record carrier 27 is illuminated by a source of light 28 through a condenser 29 which also images the source of light 28 in the plane of a lens 30. Directly behind lens 30, a diaphragm 31 is disposed in the spatial frequency plane. Diaphragm 31 and a grey wedge associated therewith is best seen in FIG. 6. Behind diaphragm 31, mirrors 42, 43, 44, 45 are disposed. Mirrors 42 and 43 guide the positive and negative images to the ocular 46 for the left eye of an observer, while mirrors 44, 45 guide the positive and negative images to the ocular 47 for the right eye 20 of the observer.

As shown in FIG. 6, the diaphragm 31 has four apertures along a circular line concentric with the optical axis of the system. Each aperture permits the passage of rays of the positive first order of diffraction of one of the four superimposed images. The aperture 31a is associated with the positive image for the left eye, the aperture 31b is associated with the negative image for the left eye, the aperture 31c is associated with the negative image for the right eye, and the aperture 31b is associated with the positive image for the right eye.

A grey wedge plate 32 is placed over the four apertures, and has sections 32a, 32c, and 32d. Section 32a, which covers aperture 31a, and section 32d, which covers aperture 31d, increase the density thereof in the same direction, while the section 32c, covering apertures 31b and 31c, has a density which increases in the opposite direction. By moving grey wedge plate 32 in the direction of the arrow 33 upward, the brightness of the left and right negatives is increased, while the brightness of the left and right positives is decreased. Opposite movement of the grey wedge plate 32 decreases the brightness of the negatives and increases the brightness of the positives so that the viewed image can be adjusted between a positive condition and a negative condition in a continuous manner.

In the arrangements described with reference to FIGS. 1 and 4 for making carrier frequency photographs, more than one positive or negative can be recorded on one record carrier. The possibility of superimposing under different conditions, for example images exposed for a longer or a shorter time period, permits by selective superimposing during the evaluation an even greater variety of picture variations. It is particularly advantageous to vary the illumination conditions during the exposure in accordance with FIG. 4 to such a great degree that one of the exposures can be made in the rising branch of the parabolic carrier frequency characteristic, and the other exposure is located in the descending branch of the exposure characteristic so that in the first case the positive and in the other case the negative results. In this manner different scale variations during the transfer of pictures and during the developing are reliably excluded.

It will be understood that each of the elements described above, or two or more together, may also find a useful application in other types of methods of reproducing X-ray pictures differing from the types described above.

While the invention has been illustrated and described as embodied in a method of stereoscopically reproducing X-ray pictures by using gratings producing diffraction orders, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adapta-

What is claimed as new and desired to be protected by Letters Patent is set forth in the appended claims.

We claim:

1. A method of reproducing stereoscopic X-ray pictures, comprising forming on two record carriers photographic pictures of two stereoscopic X-ray pictures and two different gratings; illuminating and projecting each of said X-ray pictures and the respective grating through a first aperture for producing a first image having zero diffraction order, and through a second aperture for producing a second image having a higher diffraction order than said first image and forming a combined image for each of said two record carriers, one of said first and second images being a positive image and the other being a negative image; and simultaneously decreasing the light intensity of said first image while increasing the light intensity of said second image of each of said record carriers so that each combined image is varied between positive and negative conditions while being stereoscopically viewed together with the respective other combined image.

2. A method of reproducing photographic pictures comprising making a positive photographic picture and a negative photographic picture of the same subject; forming on a photosensitive record carrier superimposed photographic pictures of said positive picture and of a first grating, and of said negative picture and a second grating; illuminating said record carrier and projecting said positive and negative pictures and said first and second gratings through at least one first aperture for producing a positive image having a predetermined diffraction order of said first grating, and through at least one second aperture for producing a negative image having a diffraction order of said second grating other than said positive image and being superimposed on the same for forming a combined image; and simultaneously decreasing the light intensity of one of said images while increasing the light intensity of the other image so that the combined image is varied between positive and negative conditions.

3. The method of claim 2 wherein X-ray pictures are reproduced; and wherein said positive and negative pictures are X-ray pictures.

4. The method of claim 3 comprising illuminating an X-ray photograph at a selected carrier frequency for different time periods or at different intensity in accordance with different parts of the carrier frequency characteristic for selectively obtaining a positive or negative photographic picture on said record carrier.

5. The method of claim 3 wherein the step of forming on said record carrier said photographic pictures and gratings includes subjecting the image of an X-ray photograph to reciprocal filtering to produce an intermediate image, and forming positive and negative images of said intermediate image and said gratings on said record carrier.

6. The method of claim 5 including reducing the size of said photographic picture before subjecting the same to said reciprocal filtering.

7. The method of claim 2 wherein the light intensities of positive and negative images is decreased and increased, respectively, by grey wedges.

8. The method of claim 2 wherein the light intensities of said positive and negative images are decreased and increased by moving oppositely graduated first and second grey wedges simultaneously over said first and second apertures.

9. The method of claim 2 wherein a pair of a positive and a negative picture of each of two stereoscopic photographs is made; wherein the two pairs of positive and negative pictures are superimposed on said record carrier together with different gratings, respectively, so that said record carrier has superimposed thereon positive and negative pictures of each of said stereoscopic pictures and of said gratings; wherein the picture on said record carrier is projected through four apertures; and wherein the light intensity of the images produced by two of said four apertures is reduced simultaneously with the increase of the light intensity of the images produced by the other two apertures.

10. The method of claim 9, wherein said two stereoscopic photographs are X-ray photographs and form positive and negative X-ray pictures on said record carrier.

* * * * *